Nov. 8, 1938.    H. A. MacFARLANE    2,136,305
RADIO ANTENNA
Filed July 6, 1936    2 Sheets-Sheet 1
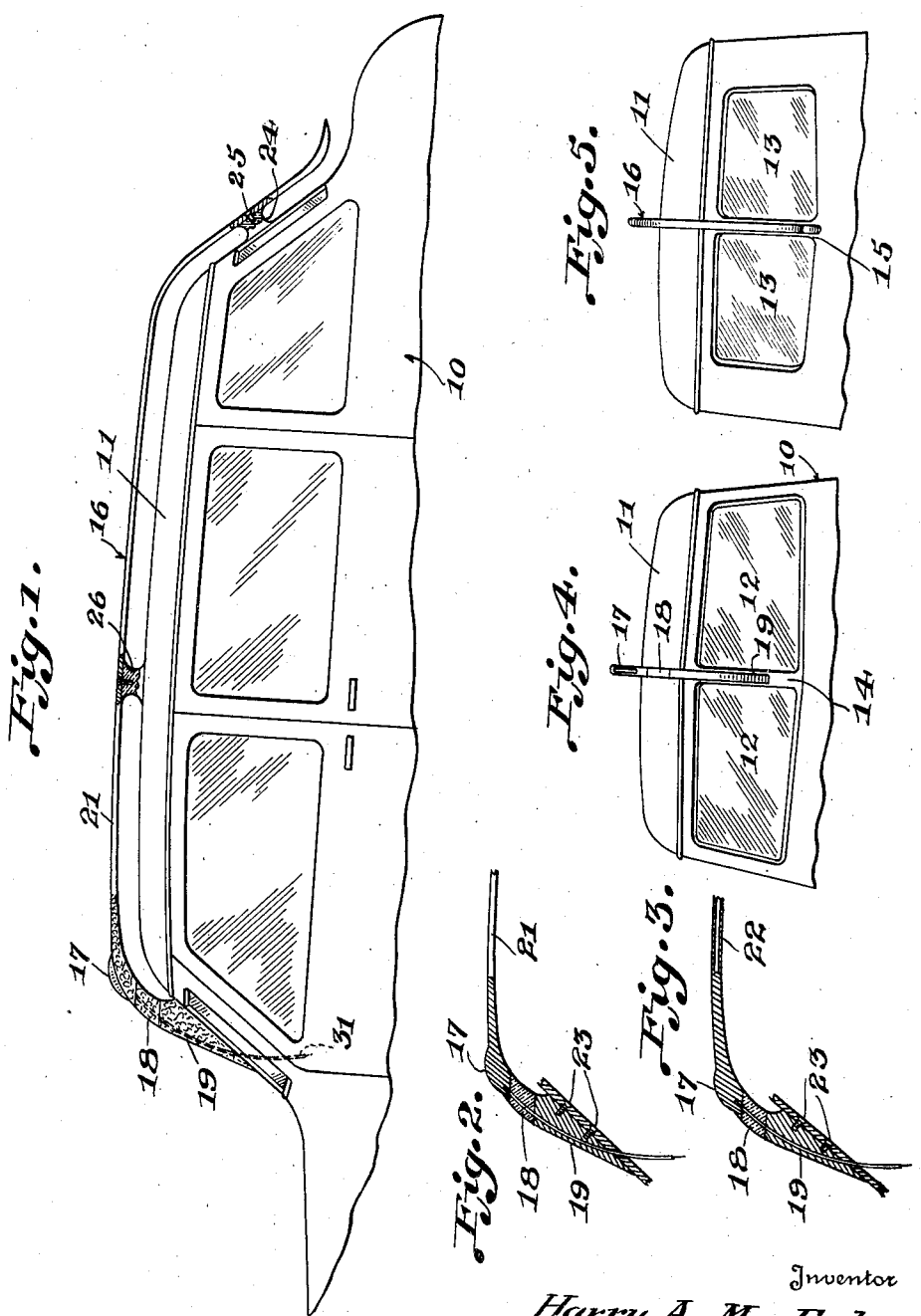
Inventor
Harry A. MacFarlane
By Kimmel & Crowell
Attorneys Nov. 8, 1938.  H. A. MacFARLANE  2,136,305
RADIO ANTENNA
Filed July 6, 1936  2 Sheets-Sheet 2
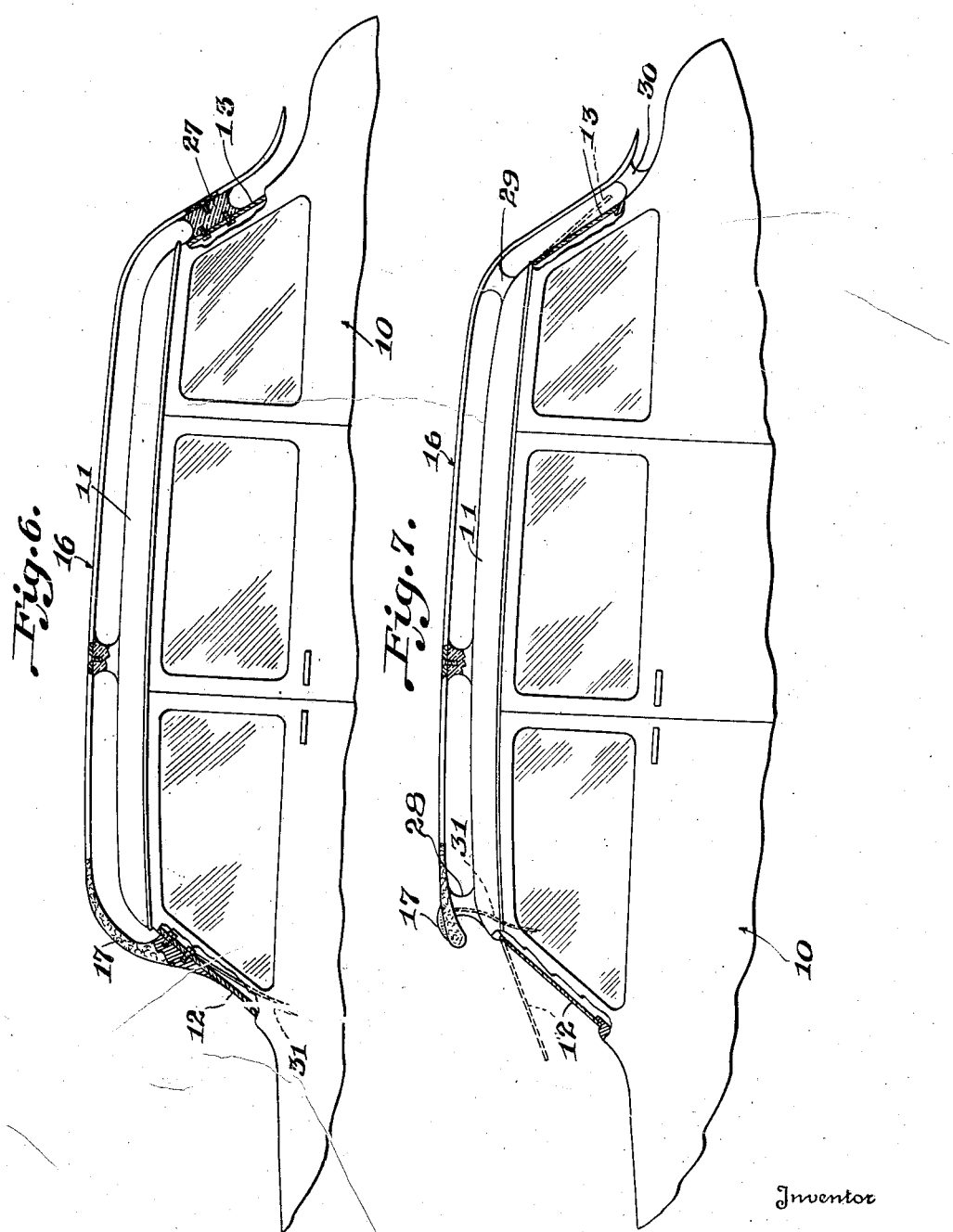

Patented Nov. 8, 1938

2,136,305

UNITED STATES PATENT OFFICE 2,136,305

RADIO ANTENNA

Harry A. MacFarlane, Marinette, Wis.

Application July 6, 1936, Serial No. 89,182

1 Claim. (Cl. 250—33)

This invention relates to a radio antenna and more particularly to an antenna of novel construction for use with automobiles.

The present day stream-line construction of automobiles and particularly those types of automobiles having the so-called turret tops have developed a problem in the trade due to the fact that these turret tops cannot be satisfactorily wired for radio. These tops which are constructed of metal and stream-line in form act as a shield to the hertzian waves and preclude the usual method of placing the radio wires within the top. In view of this the radio wires or antennae are generally placed under the running-board which has not proven satisfactory due to obvious disadvantages to such wires because of shorts and susceptibility to damage and so forth.

It is one object of this invention to provide an antenna of novel construction for use with automobile radios.

Another object is to provide a novel radio antenna that shall conform to the contour of an automobile top and be held in proper spaced relation to such top.

A further object is to provide a radio antenna for use with automobiles that shall be of such construction as will eliminate the shield effect of an automobile top to the antenna and yet be supported by such top.

A still further object is to provide a radio antenna of improved construction and novel means for mounting the same on an automobile top that shall be rugged, durable, efficient in operation and pleasing to the eye.

The above and other objects will be made apparent throughout the further description of the invention when taken in connection with the accompanying drawings wherein like reference characters refer to like parts. It is to be distinctly understood that the drawings are not a definition of the invention but merely illustrate certain forms for carrying out the invention. The scope of the invention will be defined by the appended claim.

In the drawings:—

Figure 1 is a side elevational view of an automobile top showing one form of an antenna embodying the invention, Figure 2 is a fragmental view in section of one form of an antenna embodying the invention, Figure 3 is a view similar to Figure 2 showing an antenna of a different construction, Figure 4 is a front elevational view of Figure 1, Figure 5 is a rear elevational view of Figure 1, Figure 6 is an elevational view similar to Figure 1 illustrating another embodiment of the invention, and Figure 7 is an elevational view similar to Figure 6 illustrating still another embodiment of the invention.

Referring to Figures 1 to 5, inclusively, of the drawings, 10 indicates the body of an automobile having a turret top 11, a windshield 12 and a rear window 13. The type of automobile top here shown is provided with the divisional type of windshield and rear window, the windshield being divided by the central strip or member 14 and the rear window being divided by the central strip or member 15.

These central strips 14 and 15 dividing the windshield and rear window respectively are employed in one form of the invention for supporting the opposite ends of a novel antenna represented in its entirety by 16. The front end 17 of the antenna is preferably ornamental as well as stream-line in shape and is supported from the divisional member 14 in the windshield 12 and insulated therefrom by an insulator 18 and member 19. The member 19 may be of any suitable rigid material while the insulator 18 may be constructed of rubber, Bakelite or such insulating material as will rigidly support the front end 17 of the antenna 16. That part of the antenna extending rearwardly from the front end 17 and throughout the major portion of its length may consist of a rod 21 or a tube 22 as illustrated by Figures 2 and 3 respectively. The divisional members 14 and 15 in this type of a top permit the mounting of the present antenna thereto in a manner that will hold the antenna in rigid fixed relation relative to the top. Means such as screws 23 (see Figures 2 and 3) extending through the member 14 may be employed for fixing the member 19 in rigid fixed relation therewith.

The rear end of the antenna 16 which is supported by the divisional member of the rear window 13 is spaced from the member 15 and insulated therefrom by a supporting insulator 24. The insulator 24 may be connected with the member 15 in the same manner as that described in connection with member 14 and the co-operating portion of the antenna 16 may be fastened to the insulator 24 by suitable means such as a screw 25. In this embodiment of the invention the antenna 16 is here provided with a centrally located insulator and support 26. This support 26 is preferably fixed to the center of the top at a point where the top is the strongest and preferably connected through the top and to a cross beam of the top when such cross beam is provided. The manner in which the present antenna is mounted is a very important feature of the invention and is so constructed as to remain in rigid fixed relation with the automobile top throughout the life of the automobile.

Figure 6 illustrates a different embodiment of the invention adapted to be used with those types of tops having a fixed windshield 12 and rear window 13. In this embodiment the ornamental front end 17 of the antenna 16 may extend down to contact the windshield 12 which in itself is an insulator or an insulating support or a non-insulating support, as illustrated at 27 on the rear window 13, may be employed for connecting the end 17 to the windshield 12. Also the rear end of the antenna 16 may be contacted and fixed to the rear window 13 where the rear window 13 will also operate as both an insulator and a support.

It will be noted that by forming the antenna 16 to conform to substantially the contour of the top and supporting the antenna in spaced relation to the top and substantially the same distance from the top throughout its length provides an antenna positioned for maximum reception qualities and also enhances the looks of the automobile top.

Figure 7 illustrates still another embodiment of the invention adapted for use with that type of an automobile top having a movable windshield 12 and a movable rear window 13. In this embodiment the ornamental front end 17 terminates short of the windshield and is supported on the top by means of an insulator 28 similar to 26 (see Figure 1) and the rear end of the antenna 16 may be provided with like insulator members 29 and 30 positioned above and below the rear window respectively.

The conductor 31 for connecting the front end 17 with the radio is preferably carried through the members 18 and 19 (see Figures 1, 2 and 3) when this type of antenna is employed. Figures 6 and 7 illustrate other forms of bringing the conductor 31 into the interior of the top.

While certain embodiments of the invention have been illustrated and described, it will be apparent to those skilled in the art that certain changes, substitutions, modifications, additions and omissions may be made in the several forms illustrated without departing from the spirit and scope of the appended claim.

What I claim is:—

In combination with a vehicle body provided with a metal top, a windshield structure having a center parting strip and a rear window structure; an antenna and substantially rigid insulated supporting means therefor, said antenna comprising an elongated member having a configuration in side elevation coincident with the configuration of the top and rear window structure, said supporting means including a front insulating member abutting against the front end of the elongated member and fixedly secured to said front end and projecting downwardly along said parting strip, said front insulating member forming a continuation of the elongated member and holding said front end against vibration relative to the vehicle, and a lead-in wire connected to the front end of said elongated member and projecting downwardly through said front insulating member.

HARRY A. MacFARLANE.